United States Patent [19]
Houser

[11] 3,931,558
[45] Jan. 6, 1976

[54] SCR MOTOR SPEED CONTROL SYSTEM WITH TRIGGER STABILIZATION CIRCUIT

[75] Inventor: John M. Houser, Pickens, S.C.
[73] Assignee: The Singer Company, New York, N.Y.
[22] Filed: Oct. 11, 1974
[21] Appl. No.: 513,983

[52] U.S. Cl. .............................................. 318/345
[51] Int. Cl.² .......................................... H02P 5/16
[58] Field of Search............ 318/345, 345 G, 345 C

[56] References Cited
UNITED STATES PATENTS

| | | | |
|---|---|---|---|
| 3,648,151 | 3/1972 | Gurwicz............................... | 318/345 |
| 3,753,077 | 8/1973 | Anderson............................ | 318/345 |
| 3,784,890 | 1/1974 | Geiersbach......................... | 318/345 |
| 3,854,076 | 12/1974 | Lambert.......................... | 318/345 X |

*Primary Examiner*—Benjamin Dobeck
*Attorney, Agent, or Firm*—Marshall J. Breen; Edward L. Bell; Harold Weinstein

[57] ABSTRACT

A circuit is disclosed for controlling and regulating the speed of a D.C. motor fed from a single-phase A.C. supply. A full-wave power bridge using two diodes and two silicon controlled rectifiers (SCR's) supplies unfiltered rectified A.C. to the motor. A first programmable unijunction transistor (PUT) is used to trigger the SCR's in response to a timing capacitor voltage applied to its anode. The timing capacitor is charged from a zener-regulated, full-wave bridge source through a speed-control resistor and thus provides triggering of the SCR's at a phase angle determined by said speed-control resistor. To obtain consistent triggering at the same phase angle, a second PUT is used to reset the voltage on the timing capacitor to zero at the end of each half cycle of the A.C. voltage to insure that the initial charge condition of said capacitor is always the same. A third SCR is triggered into conduction at the same that each bridge SCR is triggered and is connected to clamp the zener-regulated voltage to a low value during the conduction period. This prevents the possibility of the timing capacitor recharging to the trigger voltage a second time in the same half cycle and thus causing false triggering.

6 Claims, 1 Drawing Figure

U.S. Patent Jan. 6, 1976 3,931,558
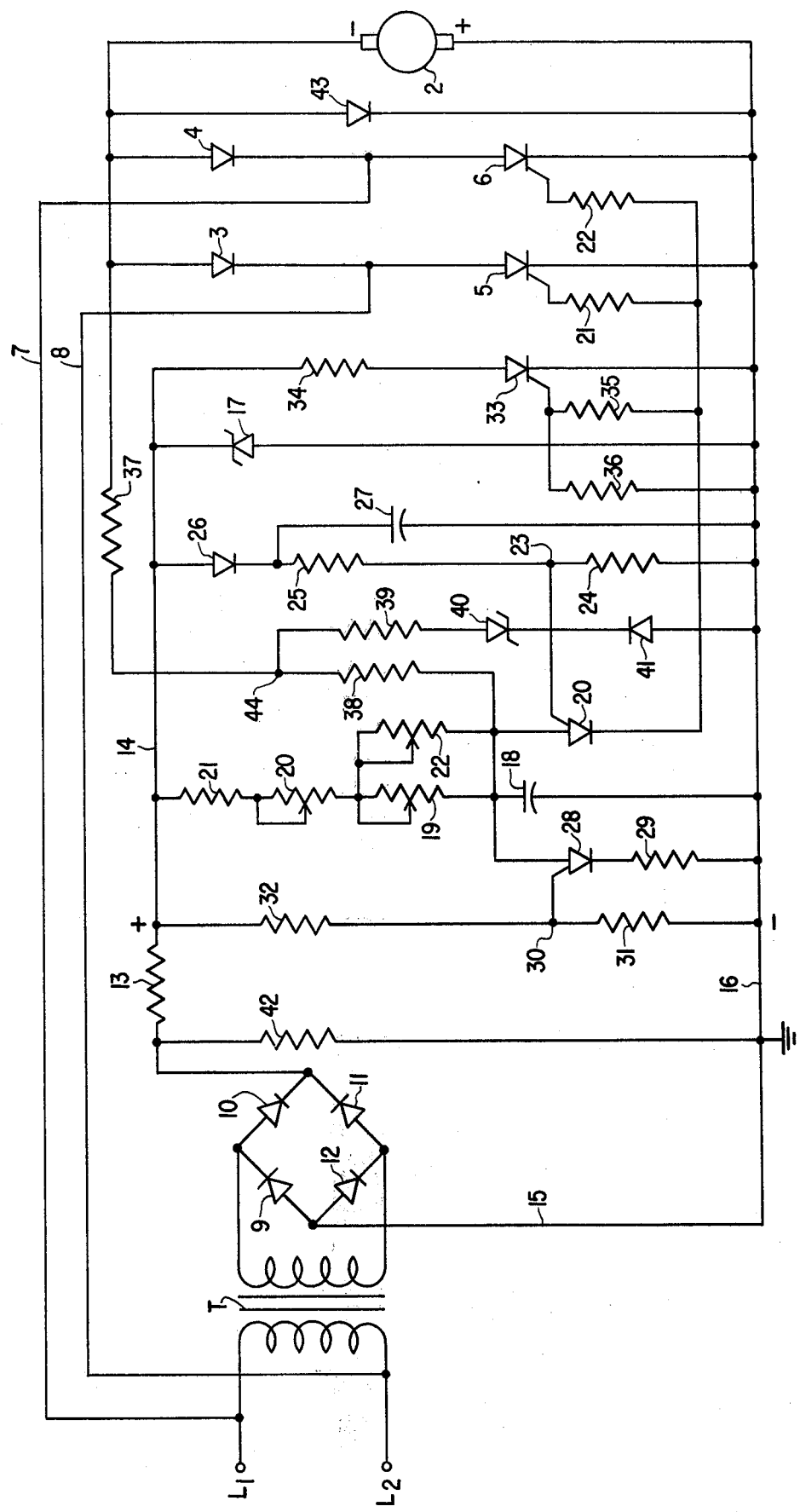

SCR MOTOR SPEED CONTROL SYSTEM WITH TRIGGER STABILIZATION CIRCUIT

BACKGROUND OF THE INVENTION

Many prior art speed control circuits for D.C. motors using SCR's are unsuitable for applications where the motor is used to power a tool for quality cutting of material. This is because, at certain speed settings, the circuit goes into a pulsing mode wherein torque is applied at spaced time intervals and results in a vibratory hammering action of the cutter which produces poor quality cuts and spoilage of material. In hand-held tools, this vibration makes it difficult to hold the tools in a firm position which merely compounds the difficulties.

An analysis of this problem has shown that best results are obtainable by using full-wave circuits and making sure that an alternate SCR is triggered during every half cycle at the same phase angle with respect to the A.C. line voltage or does not trigger at all. Further, it is essential that the SCR's having triggered during any given half cycle, should not trigger again until the proper phase angle is reached during the next half cycle.

Insofar as I am aware, no prior art circuit provides means for functionally satisfying the above-defined criterion.

SUMMARY OF THE INVENTION

It is therefore an object of this invention to provide stabilization circuitry for a full-wave SCR motor speed control system which assures SCR triggering in accordance with the criterion defined above.

In attaining the objects of this invention in a preferred embodiment thereof, a second programmable unijunction transistor (PUT) is connected so that its anode-cathode circuit forms a low-impedance path in shunt with the timing capacitor and so that, when the (PUT) is triggered into conduction, the capacitor is discharged substantially to zero voltage. The anode gate voltage for the (PUT) is obtained from a voltage divider connected across an unfiltered zener-regulated supply so that at the end of each half-cycle as the anode gate voltage follows the zener-regulated voltage toward zero, the (PUT) will be triggered and any voltage left on the timing capacitor will be discharged to ground through the anode-cathode circuit. Thus, at the beginning of each half-cycle, the timing capacitor starts charging from the same initial zero voltage condition so that the time for charging to the trigger voltage is fixed for any given value of the speed-control resistor and this insures that triggering, if it occurs at all, will occur consistently at the same phase angle with respect to the A.C. line voltage. This satisfies the first condition of the criterion defined above.

Further stabilization circuitry of the present invention includes a third (SCR) arranged to be triggered into conduction when either of the bridge SCR's are triggered. The anode-cathode circuit of this third SCR, when conducting, provides a low-impedance path which effectively clamps the zener-regulated voltage to a value well below the zener value during the conduction period. This prevents the timing capacitor from recharging to the trigger voltage within the same half cycle and thus satisfies the second condition of the criterion.

DESCRIPTION OF THE INVENTION

The single FIGURE of the drawing is a schematic circuit diagram illustrating a preferred embodiment of this invention. Referring to the figure, a D.C. motor 2, preferably of the permanent magnet type, is connected to the D.C. output of a full-wave power bridge rectifier made up of diodes, 3 and 4, and SCR's 5 and 6. The input of the bridge is connected by lines, 7 and 8, to a source, $L_1$ and $L_2$ of single phase A.C. voltage.

A second bridge rectifier, made up of diodes 9, 10, 11 and 12, has its input connected through an isolating transformer T to the A.C. voltage source $L_1$ and $L_2$. The output of this bridge is fed through dropping resistor 13 to a positive bus 14 and through lead 15 to a negative bus 16 which may be considered as the system ground. A conventional zener diode 17 clips the tops of the full-wave voltage appearing on bus 14 to the zener value thus providing a stable reference voltage for the control circuitry now to be described.

A timing capacitor 18 is connected in series with resistors 19, 20 and 21 across the reference bus 14, 16 and resistor 22 is in shunt with resistor 19. Resistors 20 and 22 are the high and low speed trim potentiometers for factory setting of these limits if desired. Resistor 21 is a current limiting resistance and 19 is the speed-control resistor. It will be seen that the above constitutes a simple RC charging circuit with the speed-control resistor 19 controlling the time rate at which the capacitor 18 is charged toward the zener voltage.

The trigger device for the SCR's 5 and 6 is a first programmable unijunction transistor (PUT) 20 having its anode connected to the top of capacitor 18 and its cathode connected through limiting resistors 21 and 22 to the respective gates of SCR's 5 and 6. The anode gate of PUT 20 is connected to junction 23 between resistors 24 and 25 connected as a voltage divider in series with blocking diode 26. A storage capacitor 27 holds the D.C. voltage at the zener value across the series resistors 24 and 25.

A second PUT 28 has its anode connected to the top of capacitor 18 and its cathode is connected through limiting resistor 29 to the negative bus 16. The anode gate of PUT 28 is connected to the junction 30 of resistors 31 and 32 connected in series across buses 14 and 16 as a voltage divider.

A third SCR 33 has its anode connected through a limiting resistor 34 to the zener regulated bus 14 and its cathode is connected to bus 16. The gate of SCR 33 is connected through resistor 35 to the cathode of PUT 20 and is also connected through resistor 36 to the bus 16. It will be seen that the SCR 33 receives a trigger pulse from PUT 20 at the same time that SCR's 5 and 6 receive their trigger pulses.

A feedback resistor 37 in series with a resistor 38 is connected between the negative terminal of the motor 2 and the top of capacitor 18. The junction 44 between resistors 37 and 38 is connected through resistor 39, zener diode 40 and blocking diode 41 to the bus 16.

A load resistor 42 keeps the bridge (9,10,11,12) in conduction continuously during each half cycle. A "free wheeling" diode 43 is connected across the terminals of the motor 2 and conducts during the time both SCR's 5 and 6 are turned off. This prevents either SCR from conducting into the next half cycle and thereby interfering with the proper circuit action. It is well known that, without the diode 43, it is possible for the inductive motor load to prevent proper SCR commutation.

OPERATION

The PUT 20 is a well-known trigger device and its known characteristics are that a blocking state exists as long as the positive anode voltage is below the positive gate voltage. However, when the anode voltage goes slightly above the gate voltage, the device is triggered into conduction and the anode-cathode path assumes a very low forward impedance.

Thus the timing capacitor 18 is charged toward the voltage on bus 14, determined by zener diode 17, at a time rate determined by the setting of the speed-control resistor 19. At some point in the half cycle, this voltage will just exceed the gate reference voltage at junction 23, determined by the voltage divider, (24,25). At this point, the PUT 20 goes into conduction and supplies a trigger pulse to the gates of SCR's 5,6, and 33. If SCR 5 and diode 4 are forward biased at this time, they will go into conduction and supply current to the motor 2. Otherwise, they will be back biased and SCR 6 and diode 3 will conduct. Each SCR will remain conducting to the end of its half cycle when it is turned off by A.C. commutation as is well known.

In this manner, power current is supplied in unidirectional pulses to the motor 2 which then provides torque to a load (not shown). If the speed-control resistor 19 is reduced in value, the capacitor 18 charges faster and the PUT 20 is triggered earlier in each half cycle which triggers the SCR's 5 and 6 earlier in the appropriate half cycle resulting in increased current to the motor and a corresponding increase in speed for a given load. Thus, far, the operation described is ordinary A.C. phase control as is well known in this art.

In order to supply speed regulation and particularly in order to make the speed vs torque characteristic of the system flatter at lower speed settings, the charging rate of the timing capacitor 18 is modified by the back E.M.F. of the motor 2, which E.M.F. is proportional to the motor speed. This is accomplished as follows:

During the time when both SCR 5 and 6 are blocking, the motor supplies a back E.M.F. proportional to its speed. This speed voltage, which is negative at the top terminal of the motor 2, as shown, is fed back through resistors 37 and 38 to the top of the timing capacitor 18. Since the speed feedback voltage is of opposite polarity from that of the zener voltage on bus 14, some charge will be subtracted from capacitor 18 as it charges. If, because of an increasing motor load, the motor speed decreases, the feedback voltage will decrease in magnitude allowing the capacitor 18 to charge faster. This allows the PUT 20 to trigger sooner at a smaller phase angle and effectively supplies more voltage to the motor which tends to compensate for the increased load and holds the speed more constant than without the feedback circuit.

It has been found that more load compensation is required at low speeds than at high speeds and this is accomplished as follows:

At low speeds, the back E.M.F. of motor 2 is low. If it is sufficiently low enough that the voltage appearing at the junction 44 between resistors 37 and 38 is lower in magnitude than the zener voltage of the zener diode 40, then the zener diode 40 will not conduct and the full back E.M.F. of motor 2 will be applied to capacitor 18 through resistors 37 and 38 and maximum compensation is effected.

However, when the voltage at junction 44 exceeds the zener voltage of zener diode 40, it goes into conduction drawing current through resistor 39. If resistors 37 and 39 are of the same value and of a much lower resistance than resistor 38, then a change in the back E.M.F. will appear about half as great at the junction 44 as it did before the zener diode 40 began to conduct. The feedback then, with diode 40 conducting, is approximately half of that before diode 40 conducts. This results in a high feedback effect at low speeds and a relatively low feedback effect at high speeds. The blocking diode 41 prevents zener diode 40 from conducting in the wrong direction.

In order to assure circuit stability, it is necessary first, that the PUT 20 triggers during every half cycle at the same phase angle with respect to the A.C. voltage, or that it does not trigger at all. That is to say, PUT 20 must not trigger every second, third, fourth, etc., half cycle. Secondly, having triggered during any given half cycle, the PUT 20 should not trigger again until the proper phase angle is reached during the next half cycle. The first problem is handled by the second PUT 28 and the second problem is handled by the third SCR 33.

The resistor voltage divider comprising resistors 31 and 32 provides a reference voltage for the gate of PUT 28 from the zener reference voltage on bus 14. However, this gate voltage is selected to be well above the gate voltage of PUT 20 during zener conduction so that PUT 28 will not trigger during the time that PUT 20 is to trigger. At the end of each half cycle, as the voltage on bus 14 falls below the zener value, any voltage left on capacitor 18 will be discharged to ground through PUT 28 and resistor 29. This occurs because the gate voltage of PUT 28 falls as the voltage on bus 14 drops from the zener value. The PUT 20 does not retrigger during this time since capacitor 27 holds the voltage for its divider resistors 24 and 25 at a constant value approximately equal to the zener value of zener diode 17. Diode 26 blocks the discharge of capacitor 27 and isolates it from the rest of the circuitry during the time that the voltage on bus 14 is below its zener value.

Thus PUT 28 operates to reset the charge on capacitor 18 at the end of each half cycle. If the RC time constant is longer than a half cycle to charge capacitor 18 to the trigger voltage of PUT 20, then, because PUT 28 triggers at the end of each half cycle, resetting capacitor 18 to approximately zero volts, PUT 20 will never trigger, thus preventing a pulsing mode where SCR triggering happens during every second, third or fourth, etc., half cycle. During normal trigger operation, since the capacitor 18 has its voltage reset at the end of every half cycle, the time to charge during each half cycle is the same. This keeps a highly stable triggering mode occurring consistently cycle after cycle.

One other problem can occur. At certain speed settings, the capacitor 18 can recharge within the same half cycle causing a secondary triggering within that half cycle and this would upset the triggering stability. It was noted previously in the circuit description that the third SCR 33 receives a trigger pulse from the PUT at the same time that SCR's 5 and 6 receive their trigger pulses. Thus, SCR 33 can be made to trigger synchronously with the triggering of SCR's 5 and 6. When the SCR 33 goes into conduction, it clamps the reference voltage of bus 14 to well below the zener value by conduction through resistor 34. This prevents the capacitor 18 from recharging to a trigger value within the same half cycle. As with the SCR's 5 and 6, the SCR 33 will commutate off at the end of the half cycle and will not turn on again until its gate is once again triggered.

From the above, it will be apparent that, in accordance with this invention, there is provided stabilization circuitry for a D.C. motor speed control and speed regulating system in which stable triggering of SCR's is accomplished. This prevents erratic triggering which would normally make such a system unsuitable for use as a drive for cutting tools where quality cutting is desired over a wide range of speeds.

While the invention has been described by means of a specific embodiment, it is not intended to be limited thereto, and obvious modifications will occur to those skilled in the art without departing from the spirit and scope of the invention as set forth in the following claims.

Having set forth the nature of this invention, what is claimed herein is:

1. A system for controlling the speed of a D.C. motor fed from an A.C. voltage source using first and second silicon controlled rectifiers (SCR's) in a full-wave configuration, comprising a full-wave, unfiltered, zener-controlled reference voltage, a timing capacitor, adjustable resistor means for charging said capacitor from said reference voltage at time-controlled rates, a first trigger device operative responsively to the attainment of a predetermined voltage on said capacitor to apply a trigger pulse to said first and second SCR's a second trigger device operative responsively to a predetermined low value of the reference voltage substantially at the end of each half cycle of the A.C. voltage to provide a low-impedance discharge path for said capacitor to assure that said capacitor is substantially discharged at the beginning of each half cycle.

2. A system in accordance with claim 1, wherein said first trigger device is a programmable unijunction transistor having its anode voltage supplied by said capacitor, and its anode gate voltage supplied from a substantially constant source of D.C. voltage.

3. A system in accordance with claim 1, wherein said second trigger device is a programmable unijunction transistor having its anode voltage supplied by said capacitor, and its anode gate voltage supplied from said unfiltered reference voltage.

4. A system in accordance with claim 1, including a third SCR operative to conduct responsively to said trigger pulse from said first trigger device to clamp the unfiltered reference voltage to a low value during its conduction period.

5. A system in accordance with claim 1, including means for applying to said capacitor a motor speed voltage of polarity opposed to said charging voltage to modify the charging rate responsively to the motor load.

6. In a motor speed control system for supplying controlled D.C. voltage to a D.C. motor from an A.C. voltage, means including first and second silicon controlled rectifiers (SCR's) for supplying full-wave rectified A.C. to said motor, means supplying a full-wave, zener-controlled reference voltage, means including a timing capacitor and an adjustable speed-control resistor for charging said capacitor from said reference voltage at an adjustable time rate, first trigger means for alternately triggering said first and second SCR's into conduction during successive half cycles of said A.C. voltage responsively to the charging voltage on said capacitor and at a point in each half cycle determined by said speed control resistor, a third SCR operative responsively to said first trigger means to clamp said reference voltage to a low value each time said first or said second SCR is triggered into conduction, and a second trigger means operative responsively to a programmed low value of the reference voltage near the end of each half cycle to discharge said capacitor substantially to zero volts so that said capacitor is always charged from the same initial condition in each half cycle.

* * * * *